United States Patent
Wu et al.

(10) Patent No.: US 10,810,326 B2
(45) Date of Patent: Oct. 20, 2020

(54) SCREEN PRIVACY PROTECTION METHOD AND SYSTEM FOR MOBILE TERMINAL DEVICE

(71) Applicant: SHENZHEN UNIVERSITY, Guangdong (CN)

(72) Inventors: Kaishun Wu, Guangdong (CN); Junjun Bao, Guangdong (CN); Jinyong Wu, Guangdong (CN); Yongpan Zou, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 353 days.

(21) Appl. No.: 15/735,203

(22) PCT Filed: Feb. 14, 2017

(86) PCT No.: PCT/CN2017/073530
§ 371 (c)(1),
(2) Date: Dec. 11, 2017

(87) PCT Pub. No.: WO2018/082217
PCT Pub. Date: May 11, 2018

(65) Prior Publication Data
US 2020/0034575 A1    Jan. 30, 2020

(30) Foreign Application Priority Data

Nov. 4, 2016  (CN) .......................... 2016 1 0963210

(51) Int. Cl.
*G06F 21/84* (2013.01)
*G06F 9/451* (2018.01)
*G06F 21/62* (2013.01)
*G06F 21/74* (2013.01)
*H04N 9/31* (2006.01)

(52) U.S. Cl.
CPC .............. *G06F 21/84* (2013.01); *G06F 9/451* (2018.02); *G06F 21/6245* (2013.01); *G06F 21/74* (2013.01); *H04N 9/315* (2013.01)

(58) Field of Classification Search
CPC ...... G06F 21/84; G06F 21/74; G06F 21/6245; G06F 9/451; H04N 9/315
USPC .......................................................... 726/26
See application file for complete search history.

(56) References Cited

U.S. PATENT DOCUMENTS

| | | | |
|---|---|---|---|
| 6,047,288 A * | 4/2000 | Kurosawa | ............... G06Q 10/10 |
| 8,265,602 B2 * | 9/2012 | Shaw | ...................... H04M 1/65 |
| | | | 379/88.18 |
| 10,223,552 B2 * | 3/2019 | Zhang | ..................... G06F 21/84 |

(Continued)

*Primary Examiner* — David J Pearson
*Assistant Examiner* — Badri Narayanan Champakesan
(74) *Attorney, Agent, or Firm* — JCIPRNET

(57) ABSTRACT

The present invention provides a screen privacy protection method and system for a mobile terminal device. The screen privacy protection method comprises an environment data acquisition step, a privacy leakage determination step, a determination step and a screen privacy protection step. The present invention has the following advantageous effects: screen privacy can be effectively protected without the addition of hardware, a very good technical effect is achieved, and the screen privacy protection method and system provided by the present invention is worthy of popularization and application.

9 Claims, 6 Drawing Sheets

(56) References Cited

U.S. PATENT DOCUMENTS

| | | | | |
|---|---|---|---|---|
| 2011/0143716 | A1* | 6/2011 | Shaw | H04M 3/53333 |
| | | | | 455/411 |
| 2014/0325594 | A1* | 10/2014 | Klein | H04L 63/08 |
| | | | | 726/2 |
| 2015/0281548 | A1* | 10/2015 | Yang | H04N 5/232 |
| | | | | 348/143 |
| 2016/0012465 | A1* | 1/2016 | Sharp | G06Q 20/10 |
| | | | | 705/14.17 |
| 2016/0134644 | A1* | 5/2016 | Chan | H04L 67/18 |
| | | | | 726/7 |
| 2016/0248809 | A1* | 8/2016 | Smith | H04L 63/20 |
| 2017/0344993 | A1* | 11/2017 | Stewart | G06Q 20/3224 |
| 2018/0301222 | A1* | 10/2018 | Dew, Sr. | G06Q 10/00 |

* cited by examiner

SCREEN PRIVACY PROTECTION METHOD AND SYSTEM FOR MOBILE TERMINAL DEVICE

CROSS-REFERENCE TO RELATED APPLICATION

This application is a 371 application of the international PCT application serial no. PCT/CN2017/073530, filed on Feb. 14, 2017, which claims the priority benefit of China application no. 201610963210.X, filed on Nov. 4, 2016. The entirety of each of the above-mentioned patent applications is hereby incorporated by reference herein and made a part of this specification.

BACKGROUND OF THE INVENTION

Field of the Invention

The present invention relates to a technology in the field of information security and privacy protection, and in particular to a screen privacy protection method and system for a mobile terminal device.

Description of Related Art

Nowadays, liquid crystal displays have gradually become the mainstream products of digital terminal display devices as the digital television media technology develops rapidly. However, with the prevalence of mobile officing and the constant update of mobile portable devices, people often read or input personal privacy information or even in-company confidential documents in public spaces, for example, people who often travel on business must use a computer for mobile officing and may feel uncomfortable if other people watch the screens they are working on, and when you takes a bus or subway, someone else may peep at your mobile phone screen either by accident or on purpose. As mobile officing and open working environments increase and high-resolution displays become popular, screen information stealing become easier and easier, and business information, company files, or even payment passwords may be easily peeped and obtained by a peeper, which leads to a more and more serious phenomenon of screen information leakage.

There are only a few technologies for reducing the leakage of screen information of the mobile devices in the prior art at present, for example, a purpose-made privacy protection display screen is used to make people see different contents from different perspectives. However, this method requires a modification to the hardware device of a user per se, which is high in price and complex in procedures. Or, a purpose-made privacy protection film is attached externally, and when the user reads privacy information, the privacy protection film is pasted on the screen to greatly reduce the definition of contents on the screen at a certain deflection angle to fulfill a privacy protection function. However, this method requires the user to carry a piece of screen protection film by itself, moreover, different sizes of screen privacy films are needed for different sizes of display screens, and the commercially available privacy protection films are slightly high in price at present and low in practicability. There is also a method to provide the user with the privacy protection by using a software programming technology, where a software makes use of a camera for background monitoring to check whether a third person enters a visible range of the screen, a system pops up a warning box or goes into a blank screen quickly when the third person enters, thereby achieving the function of protecting the user privacy. In this way, although the screen privacy of the user is effectively guaranteed, the user per se cannot proceed with the information, which greatly reduces the reading experience of the user per se and increases the inconvenience.

SUMMARY OF THE INVENTION

The present invention provides a screen privacy protection method for a mobile terminal device, comprising the following steps:

an environment data acquisition step S1: acquiring the current environmental data of the mobile terminal device to obtain an environmental data processing result;

a privacy leakage determination step S2: comparing the environmental data processing result with different security levels of environmental data features in terms of similarity to determine whether an environment where a user is currently located involves a potential security hazard of privacy leakage, if so, executing a determination step S3, or else, executing the environmental data acquisition step S1;

the determination step S3: determining whether information on a screen is in an active information sharing state or a passive privacy exposure state, if in the passive privacy exposure state, then executing a screen privacy protection step S4, and if in the active information sharing state, then executing the environment data acquisition step S1 rather than executing the screen privacy protection step S4; and turning on a camera to detect whether multiple users sharing information are present within a privacy security range of a standard screen, if so, then determining the current state to be the active information sharing state, and if the camera detects that multiple users sharing information are present within a non-privacy security range of the standard screen, then determining the current state to be the passive privacy exposure state; and the screen privacy protection step S4: starting a privacy protection function to bring the screen into a state where a peeper cannot view the information.

As a further improvement of the present invention, the environmental data acquisition step S1 comprises the following steps:

a user selection step S11: setting, by a user, a smart detection mode or a manual start mode as a mode for starting a screen protection mechanism, wherein a collection step S12 is executed in the smart detection mode and the determination step S3 is executed in the manual start mode;

the collection step S12: collecting data from a microphone and a sensor of the mobile terminal device; and an analysis step S13: analyzing user motion data and environmental sounds to obtain a current environmental security index, wherein in the privacy leakage determination step S2, when the environmental security index is higher than a set security value, a security state is determined and the user selection step S11 is returned to, and if the environmental security index is lower than the set security value, the determination step S3 is executed.

As a further improvement of the present invention, in the privacy leakage determination step S2, the camera is started to analyze the number of users currently viewing the screen in combination with a human face recognition technology and to obtain an actual relative position between each user and the screen by using an image fixed-point analysis technology, if the user currently viewing the screen is the user per se, the environmental data acquisition step S1 is returned to, and when the number of users is more than 1, the determination step S3 is executed;

in the determination step S3, a screen privacy security region is a sector region, a security privacy region S is defined as a user privacy security region by taking the screen as a circle center O, L as a safe distance, an angle α (−30°<α<30°) as an included angle of the security region in the horizontal direction, and an angle β (−50<β<50°) as an included angle of the security region in the vertical direction, and users within the region are taken as information sharers by default; the human face recognition technology and an image processing technology are used to calculate an included angle and a distance between each user and the screen, if two or more users are present in the privacy security region, the user is indicated to actively share the security region and the information, the current state of the user is the active information sharing state, the privacy protection mechanism is turned off by default for a better viewing experience, and the environmental data acquisition step S1 is returned to; and if multiple users are currently viewing the screen and are not in the privacy security region, the current information state of the user is determined to be the passive information exposure state, the screen privacy protection mechanism is started, and the screen privacy protection step S4 is executed.

As a further improvement of the present invention, in the screen privacy protection step S4, one or a combination of any of the following steps is employed for the screen privacy protection with respect to a liquid crystal screen:

a color and luminance adjustment protection step: adjusting color matching, color luminance and contrast for the display of the liquid crystal screen for privacy protection;

a color shielding protection step: reducing readability by using a fence color structure for the content displayed by the liquid crystal screen to make the liquid crystal screen undergo a color blending effect when viewed from outside of the privacy security range, thereby enabling privacy protection;

a text adjusting protection step: when the content displayed by the liquid crystal screen includes text information, obtaining a distance between the user and the liquid crystal screen by using a picture taken by the camera in combination with the human face recognition technology and the image processing technology, and reducing text size while ensuring the user can read the text clearly so that a user located beyond the security distance can hardly read the text clearly; and a readability function defining step: adjusting parameter values of screen luminance, color fence width and font size to ensure a reading experience for the user while preventing a peeper from acquiring the information, thereby enabling privacy protection.

As a further improvement of the present invention, the color and luminance adjusting protection step comprises:

reducing the display luminance of the liquid crystal screen while ensuring the readability for the user;

substituting original colors with similar colors with greatly changing luminance while ensuring the readability for the user, thereby greatly reducing the luminance of the liquid crystal screen viewed by a peeper located beyond the included angle of the security region, so that the content on the liquid crystal screen is poor in readability and the important content displayed by the liquid crystal screen is difficult to be seen clearly; and substituting an original color combination with a specified color combination without influencing the user during viewing to reduce the readability of the content viewed by the peeper, wherein in the color shielding protection step, important profiles and text contents displayed by the liquid crystal screen are displayed in a color fence structure, a corresponding blended color is used as a ground color of the liquid crystal screen, fence width is increased while ensuring high readability for the user, so that only the user located in a middle range of the screen can view all the accurate information and peepers on both sides of the screen can only see a background color, and in the text adjusting protection step, if the content currently displayed by the liquid crystal screen includes text information, the font size, left and right margins, and line spacing are adjusted so that a peeper at a distance cannot acquire accurate information, the relative distance d between the liquid crystal screen and the user and an included angle θ with the screen are obtained according to an area proportion of the user in the image taken and in combination with an image processing technology to define the font size font_size=f(d,θ), which is in direct proportion to the relative distance d and in inverse proportion to the included angle θ with the screen, and the font size is minimized while ensuring high readability for the user, thereby greatly reducing readability for the peeper at a place exceeding a certain included angle and a certain distance.

The present invention also provides a screen privacy protection system for a mobile terminal device, comprising:

an environment data acquisition module, which is used for acquiring the current environmental data of the mobile terminal device to obtain an environmental data processing result;

a privacy leakage determination module, which is used for comparing the environmental data processing result with different security levels of environmental data features in terms of similarity to determine whether an environment where a user is currently located involves a potential security hazard of privacy leakage, if so, executing a determination module, or else, executing the environmental data acquisition module;

the determination module, which is used for determining whether information on a screen is in an active information sharing state or a passive privacy exposure state, if in the passive privacy exposure state, then executing a screen privacy protection module, and if in the active information sharing state, then executing the environment data acquisition module rather than executing the screen privacy protection module; and turning on a camera to detect whether multiple users sharing information are present within a privacy security range of a standard screen, if so, then determining the current state to be the active information sharing state, and if the camera detects that multiple users sharing information are present within a non-privacy security range of the standard screen, then determining the current state to be the passive privacy exposure state; and the screen privacy protection module, which is used for starting a privacy protection function to bring the screen into a state where a peeper cannot view the information.

As a further improvement of the present invention, the environmental data acquisition module comprises:

a user selection module, by which a user sets a smart detection mode or a manual start mode as a mode for starting a screen protection mechanism, wherein a collection module is executed in the smart detection mode and the determination module is executed in the manual start mode;

the collection module, which is used for collecting data from a microphone and a sensor of the mobile terminal device; and an analysis module, which is used for analyzing user motion data and environmental sounds to obtain a current environmental security index, wherein in the privacy leakage determination module, when the environmental security index is higher than a set security value, a security state is determined and the user selection module is returned to, and if the environmental security index is lower than the set security value, the determination module is executed.

As a further improvement of the present invention, in the privacy leakage determination module, the camera is started to analyze the number of users currently viewing the screen in combination with a human face recognition technology and to obtain an actual relative position between each user and the screen by using an image fixed-point analysis technology, if the user currently viewing the screen is the user per se, the environmental data acquisition module is returned to, and when the number of users is more than 1, the determination module is executed;

in the determination module, a screen privacy security region is a sector region, a security privacy region S is defined as a user privacy security region by taking the screen as a circle center O, L as a safe distance, an angle $\alpha$ ($-30°<\alpha<30°$) as an included angle of the security region in the horizontal direction, and an angle $\beta$ ($-50°<\beta<50°$) as an included angle of the security region in the vertical direction, and users within the region are taken as information sharers by default; the human face recognition technology and an image processing technology are used to calculate an included angle and a distance between each user and the screen, if two or more users are present in the privacy security region, the user is indicated to actively share the security region and the information, the current state of the user is the active information sharing state, the privacy protection mechanism is turned off by default for a better viewing experience, and the environmental data acquisition module is returned to; and if multiple users are currently viewing the screen and are not in the privacy security region, the current information state of the user is determined to be the passive information exposure state, the screen privacy protection mechanism is started, and the screen privacy protection module is executed.

As a further improvement of the present invention, in the screen privacy protection module, one or a combination of any of the following modules is employed for the screen privacy protection with respect to a liquid crystal screen:

a color and luminance adjustment protection module, which is used for adjusting color matching, color luminance and contrast for the display of the liquid crystal screen for privacy protection;

a color shielding protection module, which is used for reducing readability by using a fence color structure for the content displayed by the liquid crystal screen to make the liquid crystal screen undergo a color blending effect when viewed from outside of the privacy security range, thereby enabling privacy protection;

a text adjusting protection module, which is used for, when the content displayed by the liquid crystal screen includes text information, obtaining a distance between the user and the liquid crystal screen by using a picture taken by the camera in combination with the human face recognition technology and the image processing technology, and reducing text size while ensuring the user can read the text clearly so that a user located beyond the security distance can hardly read the text clearly; and a readability function defining module, which is used for adjusting parameter values of screen luminance, color fence width and font size to ensure a reading experience for the user while preventing a peeper from acquiring the information, thereby enabling privacy protection.

As a further improvement of the present invention, the color and luminance adjusting protection module comprises:

reducing the display luminance of the liquid crystal screen while ensuring the readability for the user;

substituting original colors with similar colors with greatly changing luminance while ensuring the readability for the user, thereby greatly reducing the luminance of the liquid crystal screen viewed by a peeper located beyond the included angle of the security region, so that the content on the liquid crystal screen is poor in readability and the important content displayed by the liquid crystal screen is difficult to be seen clearly;

substituting an original color combination with a specified color combination without influencing the user during viewing to reduce the readability of the content viewed by the peeper, wherein in the color shielding protection module, important profiles and text contents displayed by the liquid crystal screen are displayed in a color fence structure, a corresponding blended color is used as a ground color of the liquid crystal screen, fence width is increased while ensuring high readability for the user, so that only the user located in a middle range of the screen can view all the accurate information and peepers on both sides of the screen can only see a background color, and in the text adjusting protection module, if the content currently displayed by the liquid crystal screen includes text information, the font size, left and right margins, and the line spacing are adjusted so that a peeper at a distance cannot acquire accurate information, the relative distance d between the liquid crystal screen and the user and an included angle $\theta$ with the screen are obtained according to an area proportion of the user in the image taken and in combination with an image processing technology to define the font size font_size-f(d,$\theta$), which is in direct proportion to the relative distance d and in inverse proportion to the included angle $\theta$ with the screen, and the font size is minimized while ensuring high readability for the user, thereby greatly reducing readability for the peeper at a place exceeding a certain included angle and a certain distance.

As a further improvement of the present invention, the color and luminance adjusting protection module comprises a luminance adjusting protection module and a luminance contrast adjusting module, in the luminance adjusting protection module, an image processing and analyzing technology is performed according to a picture taken by the camera to obtain a distance and an included angle between the user and the screen, perceived luminance received by the user at a definite distance and at a definite included angle is calculated with a luminance calculation formula, backlight luminous intensity displayed by the liquid crystal screen is reduced to decrease the luminance of an area source of the screen and decrease the perceived luminance received by the user, the light luminance received by the user at a longer distance from the screen and with a larger included angle with the screen decays more significantly, and the received perceived luminance is reduced more significantly, thereby achieving the purpose of protecting the readability within the security region but severely influencing the readability for the user;

in the luminance contrast adjusting module, due to the important influence of the luminance contrast to the readability, a color combination of a background color and a content color is modified according to a color perceived luminance calculation formula Y=((R*299)+(G*587)+(B*114))/1000, and the background and content are respectively endowed with opposite colors with strong contrast or a color pair with lower contrast, thereby achieving the purpose of influencing the readability for the user by changing the contrast;

in the text adjusting protection module, when the content displayed by the liquid crystal screen includes text information, a distance d between the user and the liquid crystal screen and an included angle α between the user and the screen are obtained by using the picture taken by the camera and in combination with the human face recognition technology and the image analyzing and processing technology, the font size is adjusted according to a graph of the font size versus a luminance contrast threshold in a readability measuring criterion, and the font size is reduced while ensuring the user can read the text clearly, so that a user located beyond the security region can hardly read the content of the text clearly;

the screen privacy protection module also comprises a color matching scheme adjusting module and an adjustable parameter self-coordination algorithm module, in the color matching scheme adjusting module, a color matching scheme for the display of the screen is changed, color blocks are controlled in size, similar color blocks have such a distance and spacing that the user located beyond the security region experiences a color blending phenomenon, resulting in impossibility of distinguishing the content and the background, the information displayed by the screen as viewed is subjected to severe blending and loss, thereby enabling the readability within the security region and the privacy protection beyond the security region; and in the adjustable parameter self-coordination algorithm module, the luminance contrast of the screen luminance, background color and content color and the parameter values of the color fence width, font size and color matching scheme are automatically calculated according to a real-world environment where the user is located and are self-adjusted to find out an optimal value combination of respective parameters, thereby maximally ensuring the reading experience within the security region and maximally reducing the readability beyond the security region to enable the optimized selection of an algorithm.

The present invention has the following advantageous effects: screen privacy can be effectively protected without the addition of hardware, a very good technical effect is achieved, and the screen privacy protection method and system provided by the present invention is worth of generalization and application.

DESCRIPTION OF THE EMBODIMENTS

The present invention mainly relates to a color blending technology for screen display as well as the technologies for adjusting color luminance, changing screen font size and shielding the color, providing a user with a peep-proof security protection region to implement the screen privacy protection for the user.

The mobile terminal device of the present invention comprises a mobile phone, a tablet computer, a notebook computer and the like.

Figure 1:
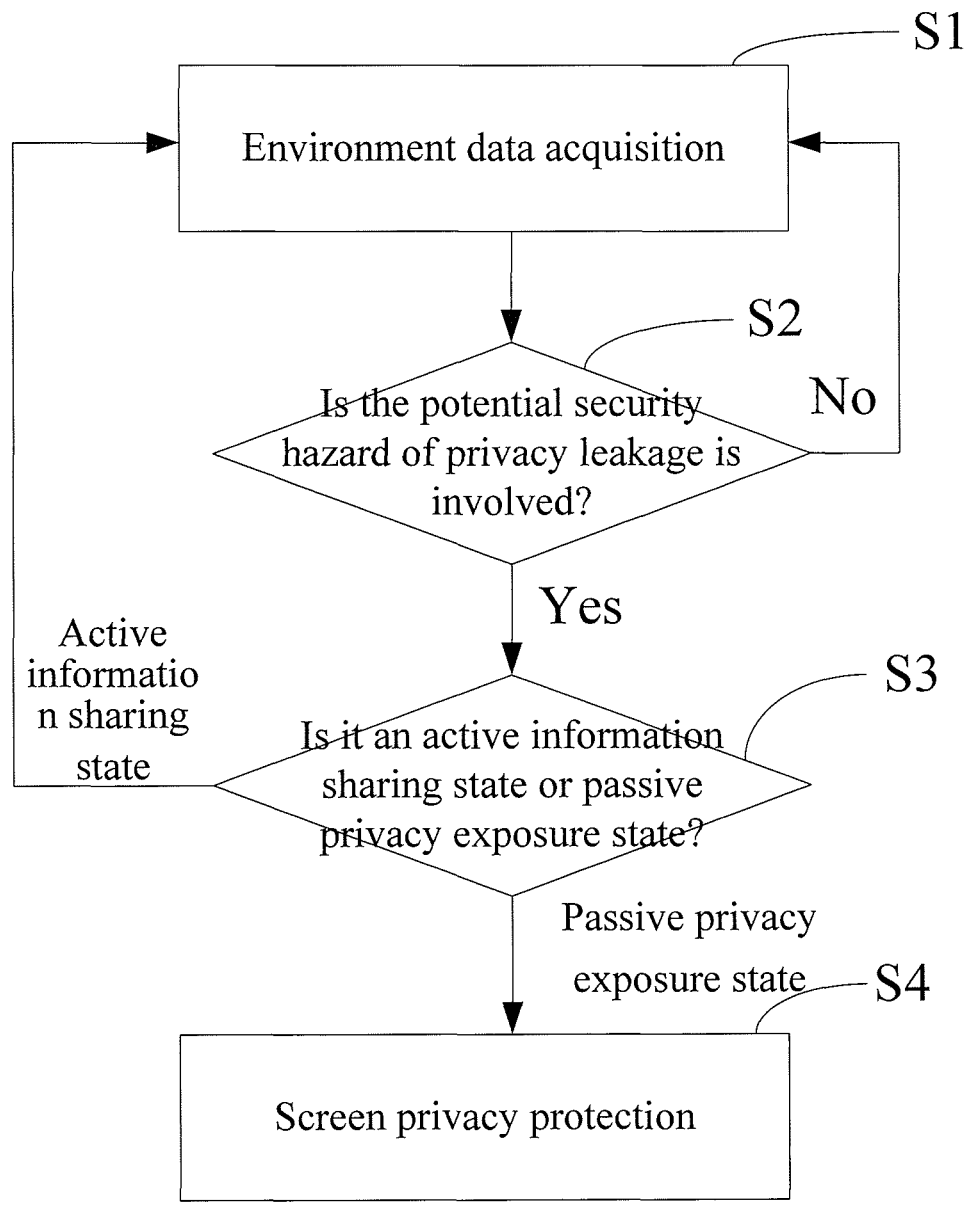
FIG. 1 is a flowchart of a method according to the present invention.

As shown in FIG. 1, the present invention provides a screen privacy protection method for a mobile terminal device, comprising the following steps:

an environmental data acquisition step S1: acquiring the current environmental data of the mobile terminal device, to be specific, performing background real-time analysis processing in combination with motion data collected by sensors such as a built-in acceleration gyroscope of the mobile device and sound data collected by a microphone of the mobile device to obtain an environmental data processing result;

a privacy leakage determination step S2: comparing the environmental data processing result with different security levels of environmental data features in terms of similarity to determine a security level of an environment where a user is currently located (whether the environment involves a potential security hazard of privacy leakage), if so, executing a determination step S3, or else, executing the environmental data acquisition step S1;

the determination step S3: determining whether to enable a privacy protection function according to the security level of the environment where the user is currently located, wherein when the security level of the environment where the user is currently located is lower than a security value, the state at this point can be divided into an active information sharing state and a passive privacy exposure state, and the content displayed by the information may be text information, video information and the like; determining whether information on a screen is in the active information sharing state or the passive privacy exposure state, if in the passive privacy exposure state, then executing a screen privacy protection step S4, and if in the active information sharing state, then executing the environment data acquisition step S1 rather than executing the screen privacy protection step S4; and turning on a camera to detect whether multiple users sharing information are present within a privacy security range of a standard screen, if so, then determining the current state to be the active information sharing state, and if the camera detects that multiple users sharing information are present within a non-privacy security range of the standard screen, then determining the current state to be the passive privacy exposure state; and the screen privacy protection step S4: starting a privacy protection function to bring the screen into a state where a peeper cannot view the information.

In the screen privacy protection step S4, the information can be possibly prevented from being peeped by means of such as temporary blank screen or screen protection.

Figure 2:
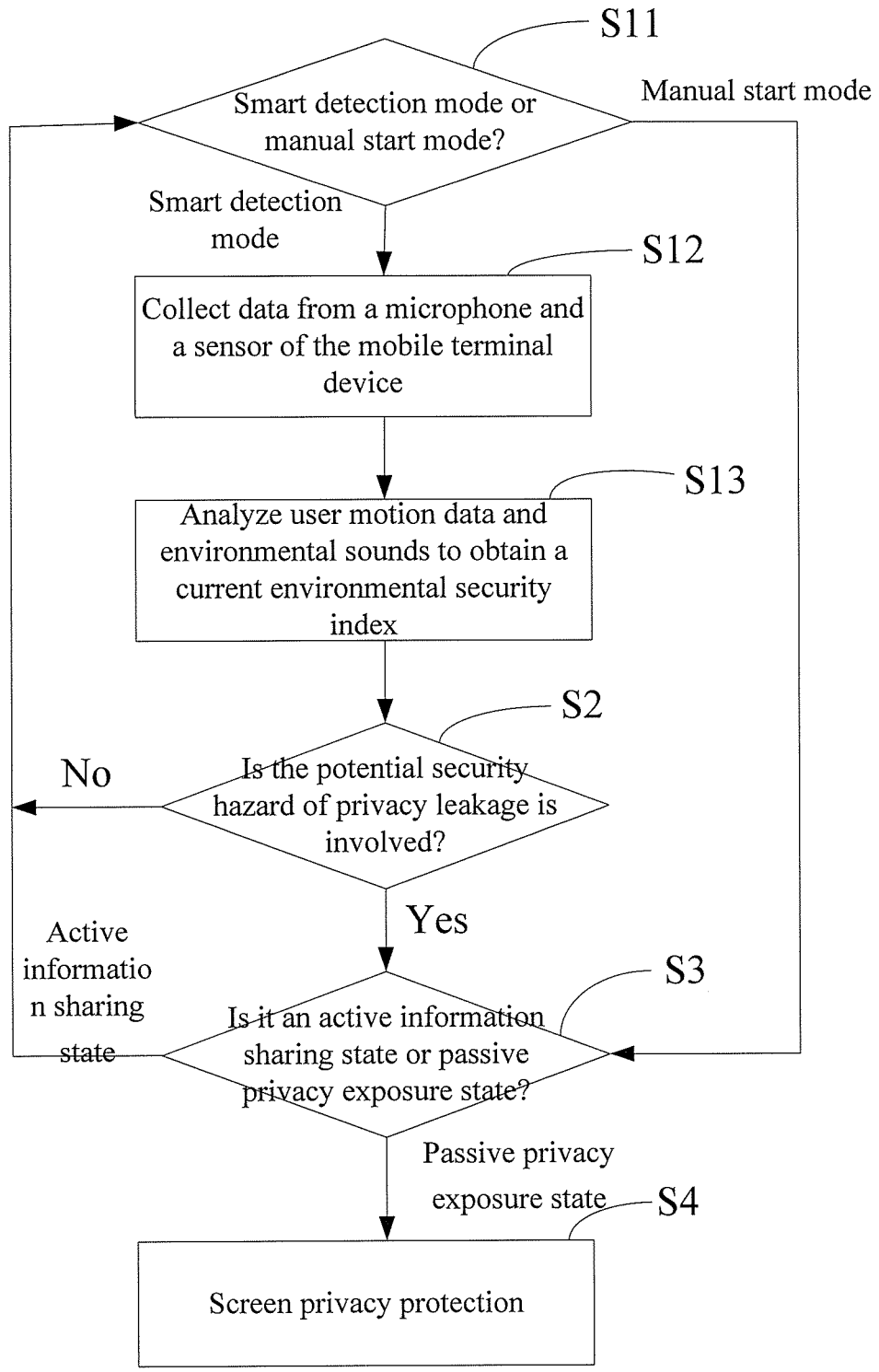
FIG. 2 is a flowchart of a method according to an embodiment of the present invention.
Figure 3:
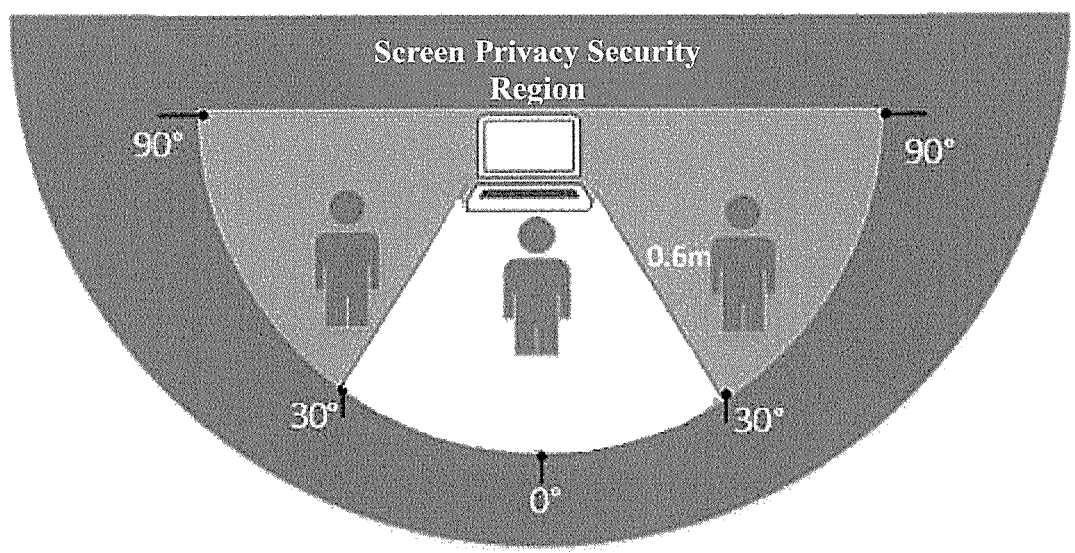
FIG. 3 is a diagram showing a screen privacy security region (in the horizontal direction)
Figure 4:
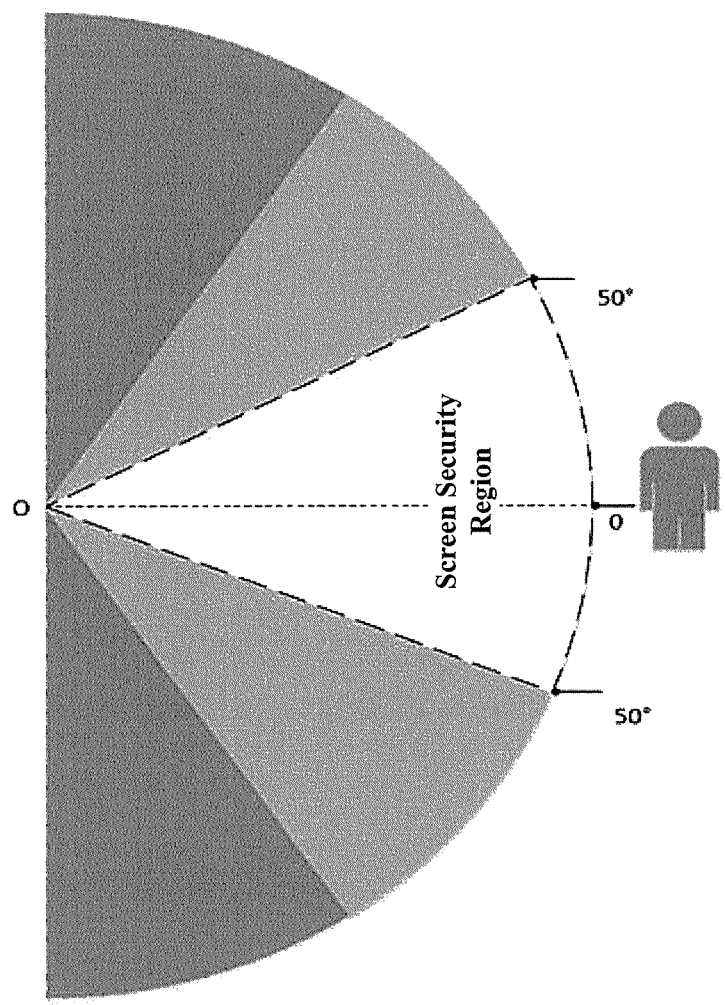
FIG. 4 is a diagram showing a screen privacy security region (in the vertical direction)
Figure 5:
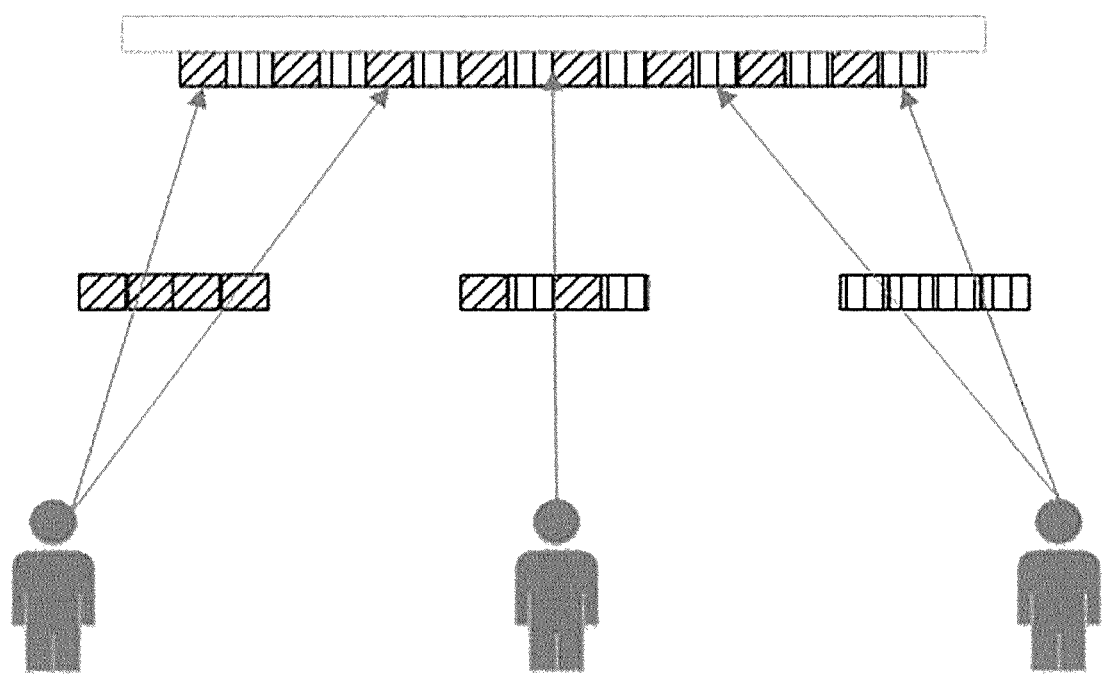
FIG. 5 is a diagram showing a color shielding phenomenon.

As shown in FIG. 2, the environmental data acquisition step S1 comprises the following steps:

a user selection step S11: setting, by a user, a smart detection mode or a manual start mode as a mode for starting a screen protection mechanism, wherein a collection step S12 is executed in the smart detection mode and the determination step S3 is executed in the manual start mode;

the collection step S12: collecting data from a microphone and a sensor (including an accelerometer and a gyroscope) of the mobile terminal device; and an analysis step S13: analyzing the user motion data and sound data to obtain a current environmental security index, to be specific, processing sensor data to obtain a motion data feature of the user to determine an approximate state (such as a stationary state, a walking state, or a state in transport facilities such as a car, a train and a bus), meanwhile, turning on the microphone of the mobile phone to collect environmental noise data to determine the current environment noise level, and determine the environmental security index of a current state of the user in combination with the motion state of the user and the environment noise level, wherein in the privacy leakage determination step S2, when the environmental security index is higher than a set security value, a security state is determined and the user selection step S11 is returned to, and if the environmental security index is lower than the set security value, the determination step S3 is executed.

In the privacy leakage determination step S2, the camera is started to analyze the number of users currently viewing the screen in combination with a human face recognition technology and to obtain an actual relative position between each user and the screen by using an image fixed-point analysis technology, if the user currently viewing the screen is the user per se, the environmental data acquisition step S1 is returned to, and when the number of users is more than 1, the determination step S3 is executed.

In the determination step S3, a screen privacy security region is a sector region, a security privacy region S is defined as a user privacy security region by taking the screen as a circle center O, L (L<=0.6 m) as a safe distance, an angle α (−30°<α<30°) as an included angle of the security region in the horizontal direction, and an angle β (−50°<β<50°) as an included angle of the security region in the vertical direction, and users within the region are taken as information sharers by default; the human face recognition technology and an image processing technology are used to calculate an included angle and a distance between each user and the screen, if two or more users are present in the privacy security region, the user is indicated to actively share the security region and the information, the current state of the user is the active information sharing state, the privacy protection mechanism is turned off by default for a better viewing experience, and the environmental data acquisition step S1 is returned to; and if multiple users are currently viewing the screen and are not in the privacy security region, the current information state of the user is determined to be the passive information exposure state, the screen privacy protection mechanism is started, and the screen privacy protection step S4 is executed.

In the screen privacy protection step S4, one or a combination of any of the following steps is employed for the screen privacy protection with respect to a liquid crystal screen:

a color and luminance adjusting protection step: modifying color matching, color luminance and contrast displayed by the liquid crystal screen of the mobile terminal based on an optical heterogeneity principle, since a color distortion phenomenon may occur when a certain angle is formed with the screen after light obtains certain directionality through refraction and reflection due to the special shape of liquid crystal molecules and the color, luminance and contrast for the screen display may change significantly during the color distortion of the screen;

a color shielding protection step: reducing readability by using a fence color structure for the content displayed by the liquid crystal screen based on the principle of the color shielding effect to make the liquid crystal screen undergo a color blending effect when viewed from outside of the privacy security range, thereby enabling privacy protection;

a text adjusting protection step: when the content displayed by the liquid crystal screen includes text information, obtaining a distance between the user and the liquid crystal screen by using a picture taken by the camera in combination with the human face recognition technology and the image processing technology, and reducing text size while ensuring the user can read the text clearly so that a user located beyond the security distance can hardly read the text clearly; and a readability function defining step: defining a readability function, adjusting parameter values of screen luminance, color fence width and font size when the readability of the liquid crystal screen is not less than 80% to ensure a reading experience for the user while preventing a peeper from acquiring the information, thereby implementing a privacy protection software without additional hardware and user influence.

As a preferred embodiment of the present invention, the color and luminance adjusting protection step comprises:

reducing the display luminance of the screen while ensuring high readability for the user;

substituting original colors with similar colors with greatly changing luminance while ensuring the readability for the user based on the principle that a color displayed by the screen may significantly change in luminance after being deflected by a certain angle, thereby greatly reducing the luminance of the screen viewed by a peeper located beyond the included angle of the security region, so that the content on the screen is poor in readability and the important content displayed by the screen is difficult to be seen clearly; and by virtue of the phenomenon that some colors display the same color after being combined at a certain angle, substituting an original color combination with a special color combination without influencing the user during viewing to greatly reduce the readability of the content viewed by the peeper.

As a preferred embodiment of the present invention, in the color shielding protection step, by virtue of the phenomenon of color blending due to certain angle of deflection based on the color shielding principle, important profiles and text contents displayed by the screen are displayed in a color fence structure, a corresponding blended color is used as a ground color of the liquid crystal screen, fence width is increased while ensuring high readability for the user, so that only the user located in a middle range of the screen can view all the accurate information and peepers on both sides of the screen can only see a background color, with the real information on the screen being seriously missed.

As a preferred embodiment of the present invention, in the text adjusting protection step, if the content currently displayed by the screen includes text information, the font size, left and right margins, and line spacing are adjusted so that a peeper at a distance cannot acquire accurate information. The number of users currently viewing the screen is analyzed in combination with the human face recognition technology, an actual relative position between each user and the screen is obtained by using an image fixed-point analysis technology, the relative distance d between the screen and the user and an included angle θ with the screen are obtained according to an area proportion of the user in an image taken and in combination with an image processing technology to define the font size font_size=f(d,θ), which is in direct proportion to the relative distance d and in inverse proportion to the included angle θ with the screen. The font size is minimized while ensuring high readability for the user, thereby greatly reducing readability for the peeper at a place exceeding a certain included angle and a certain distance.

In the readability function defining step, a readability function readability=f(luminance, fencewidth, font_size) is defined, and influencing parameters are screen luminance, color fence structure width and font size respectively. The three parameter values of screen luminance, font size and fence width are coordinated while ensuring readability for the user per se, so that the screen readability for a user beyond the security region is far lower than a normal value. Thus, the privacy protection software is implemented without addition hardware and user influence.

The security region is established so that a better readability is achieved for a user in the security region and the readability is significantly reduced for a user beyond the security region. As is known, the security region is a stereoscopic sector region taking the screen as a center with an angle of +30° in the horizontal direction and an angle of +50° in the vertical direction at a distance of 0.6 m.

The differentiation between the security region and an ambient environment is determined by a distance from the screen and an included angle with the screen. We modify readability influencing factors such as the font size, color and contrast displayed by the screen coordinately according to a readability measuring function.

I. Readability Measuring Criterion

RVP (Related Visual Performance) is an important index for measuring the reading quality of the content and is an index for the subjective perception and understanding level of a user during the reading of a literature, but is irrelevant with the education level of the user. Whether the content displayed by the screen has an appropriate resolution, whether the content is clear, as well as the font size, font style, content composition, color matching scheme and the like may have an influence to the reading experience of the user to further influence the readability for the user.

Figure 6:
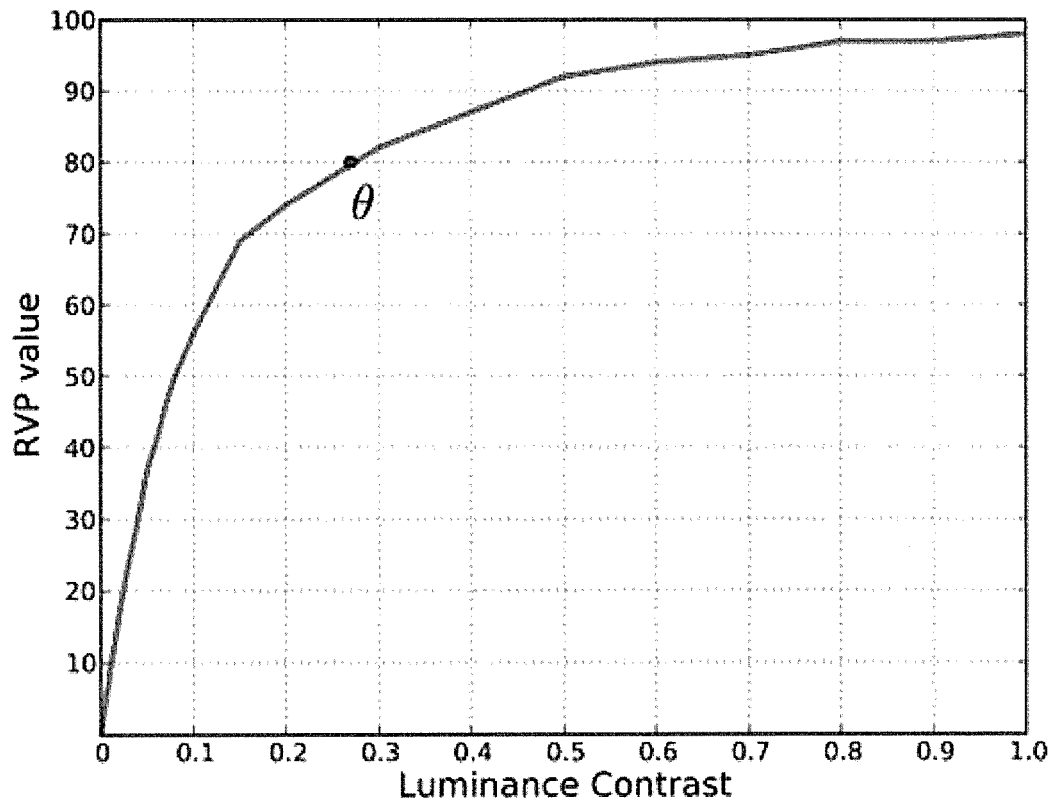
FIG. 6 depicts a graph of contrast versus readability.

1. Luminance contrast: the luminance contrast is the contrast between the background luminance and content luminance, the value of the luminance contrast has the highest influence on the readability of the screen display, when the contrast increases, the value of the readability increases exponentially, and when the contrast increases to a certain value, the increasing trend of the readability slows down and tends to 100% with the increase of the contrast. When the readability of the content is more than 80%, the user is considered to experience a better readability, and when the readability is less than 50%, the content readability is considered to be poor. FIG. 6 depicts a graph of contrast versus readability.

Calculation of luminance of a screen light source: since screen light is an area source, maximal luminance MAX is measured under a white background of the screen, a ratio of the luminance of the screen area source to the maximal luminance MAX at any luminous intensity under any color combination is calculated from a known luminous intensity and color perception luminance calculation formula $Y=((R*299)+(G*587)+(B*114))/1000$, thereby obtaining luminance $L_{source}$ of the screen area source for any color at any luminous intensity.

Luminance contrast: the area source luminance $L_{back\text{-}ground}$ of a screen background and the area source luminance $L_{content}$ of the screen content are respectively calculated according to the color combination and area proportion of a background and content displayed by the screen, and then, the distance d and an included angle α between the user and the screen are obtained with image fixed-point analysis technology, and the luminance contrast at a position where the user is located is calculated in combination with an optical luminance calculation formula. As can be known from FIG. 6, when the value of the luminance contrast is more than or equal to θ, a RVP value of more than 80% and a better readability is achieved for the user.

That is, the θ value is a luminance contrast threshold for ensuring the readability of the user.

2. Font size: the size of an observed target is another important criterion influencing the readability for the user, the font is typically a key privacy protection object in the screen display, the font size has a very significant influence to the readability for the user, if the font size is slightly large, even a user far away from the screen can also see the content on the screen clearly, and if the font size is slightly small, the user may have to get close to read the screen, which severely influences the user experience.

Figure 7:
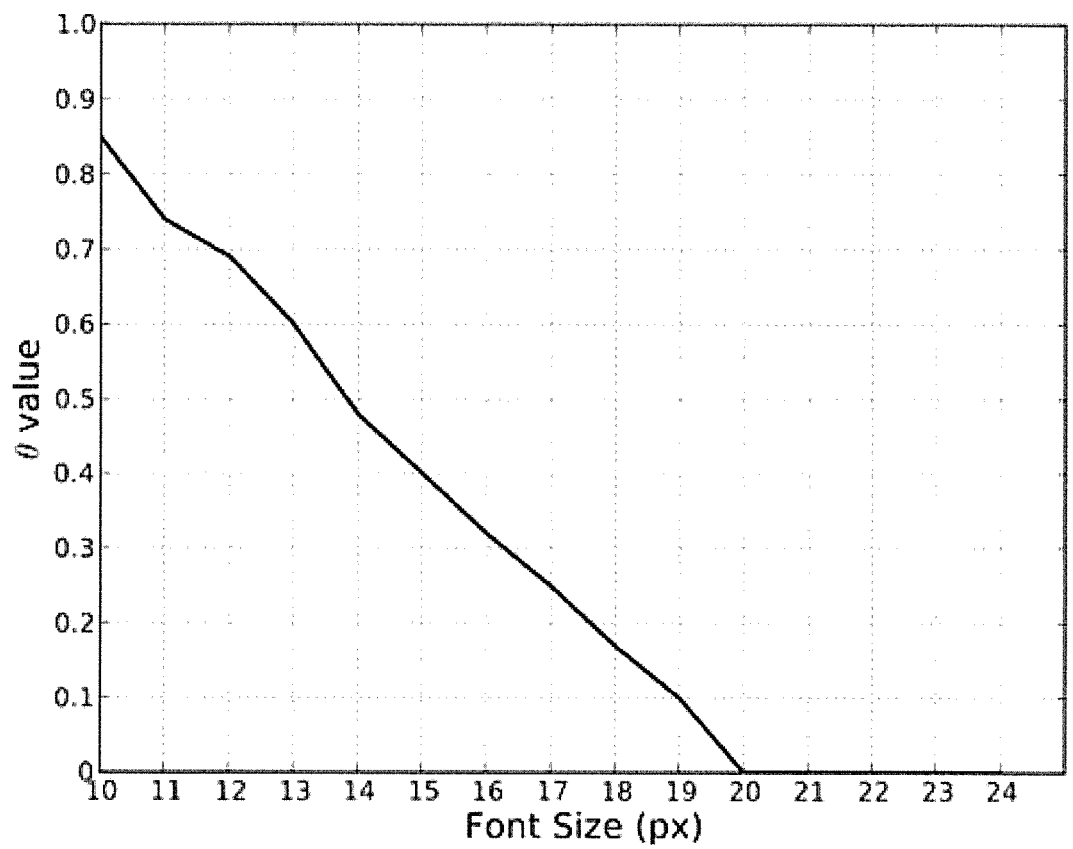
FIG. 7 depicts a graph of font size versus a luminance contrast threshold.

The larger the font size, the better the readability for the user, and the smaller the font size, the poorer the readability for the user. The font size and the luminance contrast collectively influence the readability for the user. FIG. 7 depicts a graph of the font size versus the θ value (the luminance contrast threshold). As can be known, to ensure the readability for the user, the value of the luminance contrast may be properly reduced when the font size is large, but when the font size is small, the luminance contrast must be increased to ensure the readability for the user.

II. Adjust the screen display according to the readability measuring criterion to enable screen protection.

A color distortion phenomenon may occur when a certain angle is formed with the screen after light obtains certain directionality through refraction and reflection due to the special shape of liquid crystal molecules. The color, luminance and contrast for the screen display may change significantly during the color distortion of the screen. The color matching, color luminance and font size displayed by the liquid crystal screen of the mobile terminal are modified based on the optical heterogeneity principle.

A luminance adjusting protection step: an image processing and analyzing technology is performed according to a picture taken by the camera to obtain a distance and an included angle between the user and the screen, and perceived luminance received by the user at a definite distance and at a definite included angle is calculated with a luminance calculation formula. Backlight luminous intensity displayed by the liquid crystal screen is reduced to decrease the luminance of an area source of the screen and decrease the perceived luminance received by the user, the light luminance received by the user at a longer distance from the screen and with a larger included angle with the screen are decayed more significantly, and the received perceived luminance is reduced more significantly, thereby achieving the purpose of protecting the readability within the security region but severely influencing the readability for the user.

A luminance contrast adjusting step: due to the important influence of the luminance contrast to the readability, a color combination of a background color and a content color are modified according to a color perceived luminance calculation formula $Y=((R*299)+(G*587)+(B*114))/1000$, and the background and content are respectively endowed with opposite colors with strong contrast or a color pair with lower contrast, thereby achieving the purpose of influencing the readability for the user by changing the contrast.

A color shielding protection step: since a light ray is transmitted linearly, an object is shielded by another object at a certain angle, human eyes can only see the front object but not the shielded object. With this principle, the content on the screen is displayed in a color fence structure, the width of a color fence is adjusted so that adjacent color pieces can be completely shielded when the deflection angle reaches 30°, therefore, a color blending effect may occur when the screen is watched from a place beyond the privacy security range, a user in front of the front area of the screen can receive complete information, users at a place beyond certain included angles on both sides of the screen can only see part of the content, and information deficiency reduces the readability for the users beyond the security region, thereby implementing privacy protection.

A text adjusting protection step: when the content displayed by the liquid crystal screen includes text information, the distance d between the user and the liquid crystal screen and an included angle α between the user and the screen are obtained by using the picture taken by the camera and in combination with the human face recognition technology and the image analyzing and processing technology according to S21, and the font size is adjusted according to a graph of the font size versus a luminance contrast threshold in a readability measuring criterion. The font size of the text is reduced while ensuring the user can clearly read the text, so that the users beyond the security region can hardly read the text content clearly.

A color matching scheme adjusting step: colors may get blended under certain conditions of position, size and sight distance with respect to the vision of a person, and such a color blending phenomenon is called spatial color mixing. The spatial color blending phenomenon is that rich colors are seen at a near distance, and uniform colors are seen at a far distance. A color matching scheme for the display of the screen is changed to control the size of color blocks, similar color blocks have such a distance and spacing that the user located beyond the security region experiences a color blending phenomenon, resulting in impossibility of distinguishing the content and the background, the information displayed by the screen as viewed is subjected to severe blending and loss, thereby enabling the readability within the security region and the privacy protection beyond the security region.

An adjustable parameter self-coordination algorithm step: a coordination algorithm concerning the readability and adjustable parameters is proposed according to the readability measuring criterion and the calculation method formula for each parameter. The luminance contrast of the screen luminance, background color and content color and the parameter values of the color fence width, font size and color matching scheme are automatically calculated according to a real-world environment where the user is located and are self-adjusted to find out an optimal value combination of respective parameters. The reading experience in the security region is maximally ensured, and the readability beyond the security region is maximally reduced, enabling the optimal selection of the algorithm.

According to the present invention, whether the information on the screen is in the active information sharing state or the passive privacy exposure state is determined at first, and if in the passive privacy exposure state, the screen privacy protection step S4 is executed; in the screen privacy protection step S4, a plurality of screen privacy protection methods are proposed with respect to the liquid crystal screen, the inventor makes constant efforts to achieve a very good technical effect without the addition of hardware, which demonstrates the technical contribution of the present solution, and those skilled in the art cannot obtain the abovementioned technical solution without repeated study and constant efforts; and more specifically, the combination of the determination step S3 and the screen privacy protection step S4 in the present invention is the key point of the present invention, and it is not easy for those skilled in the art to think up of the technical solutions of the above two steps, thereby demonstrating the inventiveness of the present invention.

The present invention also discloses a screen privacy protection system for a mobile terminal device, comprising:

an environment data acquisition module, which is used for acquiring current environmental data of the mobile terminal device to obtain an environmental data processing result;

a privacy leakage determination module, which is used for comparing the environmental data processing result with different security levels of environmental data features in terms of similarity to determine whether an environment where a user is currently located involves a potential security hazard of privacy leakage, if so, executing a determination module, or else, executing the environmental data acquisition module;

the determination module, which is used for determining whether information on a screen is in an active information sharing state or a passive privacy exposure state, if in the passive privacy exposure state, then executing a screen privacy protection module, and if in the active information sharing state, then executing the environment data acquisition module rather than executing the screen privacy protection module; and turning on a camera to detect whether multiple users sharing information are present within a privacy security range of a standard screen, if so, then determining the current state to be the active information sharing state, and if the camera detects that multiple users sharing information are present within a non-privacy security range of the standard screen, then determining the current state to be the passive privacy exposure state; and the screen privacy protection module, which is used for starting a privacy protection function to bring the screen into a state where a peeper cannot view the information.

The environmental data acquisition module comprises:

a user selection module, by which a user sets a smart detection mode or a manual start mode as a mode for starting a screen protection mechanism, wherein a collection module is executed in the smart detection mode and the determination module is executed in the manual start mode;

the collection module, which is used for collecting data from a microphone and a sensor of the mobile terminal device; and an analysis module, which is used for analyzing user motion data and environmental sounds to obtain a current environmental security index, wherein in the privacy leakage determination module, when the environmental security index is higher than a set security value, a security state is determined and the user selection module is returned to, and if the environmental security index is lower than the set security value, the determination module is executed.

In the privacy leakage determination module, the camera is started to analyze the number of users currently viewing the screen in combination with a human face recognition technology and to obtain actual relative positions between the users and the screen by using an image fixed-point analysis technology, if the user currently viewing the screen is the user per se, the environmental data acquisition module is returned to, and when the number of users is more than 1, the determination module is executed;

in the determination module, a screen privacy security region is a sector region, a security privacy region S is defined as a user privacy security region by taking the screen as a circle center O, L as a safe distance, an angle α ($-30°<α<30°$) as an included angle of the security region in the horizontal direction, and an angle β ($-50°<β<50°$) as an included angle of the security region in the vertical direction, and users within the region are taken as information sharers by default; the human face recognition technology and an image processing technology are used to calculate an included angle and a distance between each user and the screen, if two or more users are present in the privacy security region, the user is indicated to actively share the security region and the information, the current state of the user is the active information sharing state, the privacy protection mechanism is turned off by default for a better viewing experience, and the environmental data acquisition module is returned to; and if multiple users are currently viewing the screen and are not in the privacy security region, the current information state of the user is determined to be the passive information exposure state, the screen privacy protection mechanism is started, and the screen privacy protection module is executed.

In the screen privacy protection module, one or a combination of any of the following modules is employed for the screen privacy protection with respect to a liquid crystal screen:

a color and luminance adjustment protection module, which is used for adjusting color matching, color luminance and contrast for the display of the liquid crystal screen for privacy protection;

a color shielding protection module, which is used for reducing readability by using a fence color structure for the content displayed by the liquid crystal screen to make the liquid crystal screen undergo a color blending effect when viewed from outside of the privacy security range, thereby enabling privacy protection;

a text adjusting protection module, which is used for, when the content displayed by the liquid crystal screen includes text information, obtaining a distance between the user and the liquid crystal screen by using a picture taken by the camera in combination with the human face recognition technology and the image processing technology, and reducing text size while ensuring the user can read the text clearly so that a user located beyond the security distance can hardly read the text clearly; and a readability function defining module, which is used for adjusting the parameter values of screen luminance, color fence width and font size to ensure a reading experience for the user while preventing a peeper from acquiring the information, thereby enabling privacy protection.

As a preferred embodiment of the present invention:

the color and luminance adjusting protection module comprises:

reducing the display luminance of the liquid crystal screen while ensuring the readability for the user;

substituting original colors with similar colors with greatly changing luminance while ensuring the readability for the user, thereby greatly reducing the luminance of the liquid crystal screen viewed by a peeper located beyond the included angle of the security region, so that the content on the liquid crystal screen is poor in readability and the important content displayed by the liquid crystal screen is difficult to be seen clearly;

substituting an original color combination with a specified color combination without influencing the user during viewing to reduce the readability of the content viewed by the peeper, wherein in the color shielding protection module, important profiles and text contents displayed by the liquid crystal screen are displayed in a color fence structure, a corresponding blended color is used as a ground color of the liquid crystal screen, fence width is increased while ensuring high readability for the user, so that only the user located in a middle range of the screen can view all the accurate information and peepers on both sides of the screen can only see a background color, and in the text adjusting protection module, if the content currently displayed by the liquid crystal screen includes text information, the font size, left and right margins, and line spacing are adjusted so that a peeper at a distance cannot acquire accurate information, the relative distance d between the liquid crystal screen and the user and an included angle θ with the screen are obtained according to an area proportion of the user in the image taken and in combination with an image processing technology to define the font size font_size=$f(d,θ)$, which is in direct proportion to the relative distance d and in inverse proportion to the included angle θ with the screen, and the font size is minimized while ensuring high readability for the user, thereby greatly reducing readability for the peeper at a place exceeding a certain included angle and a certain distance.

To overcome the defects of the abovementioned technologies and methods, the present invention proposes to greatly reduce the readability by deflecting the content displayed by the screen by a certain angle by using the optical heterogeneity caused by the special physical structure of the liquid crystal displayer and in combination with the screen font size adjusting technology and the color luminance and color shielding technology, without influencing the good readability for the user per se within the screen privacy security range.

The system provided by the present invention also comprises the following modules.

A luminance adjusting protection module: an image processing and analyzing technology is performed according to a picture taken by the camera to obtain a distance and an included angle between the user and the screen, and perceived luminance received by the user at a definite distance and at a definite included angle is calculated with a luminance calculation formula. Backlight luminous intensity displayed by the liquid crystal screen is reduced to decrease the luminance of an area source of the screen and decrease the perceived luminance received by the user, the light luminance received by the user at a longer distance from the screen and with a larger included angle with the screen decays more significantly, and the received perceived luminance is reduced more significantly, thereby achieving the purpose of protecting the readability within the security region but severely influencing the readability for the user.

A luminance contrast adjusting module: due to the important influence of the luminance contrast to the readability, a color combination of a background color and a content color is modified according to a color perceived luminance calculation formula Y=((R*299)+(G*587)+(B*114))/1000, and the background and content are respectively endowed with opposite colors with strong contrast or a color pair with lower contrast, thereby achieving the purpose of influencing the readability for the user by changing the contrast.

A color shielding protection module: since a light ray is transmitted linearly, an object is shielded by another object at a certain angle, human eyes can only see the front object but not the shielded object. With this principle, the content on the screen is displayed in a color fence structure, the width of a color fence is adjusted so that adjacent color pieces can be completely shielded when the deflection angle reaches 30°, therefore, a color blending effect may occur when the screen is watched from a place beyond the privacy security range, a user in front of a front area of the screen can receive complete information, users at a place beyond certain included angles with two sides of the screen can only see part of the content, and information deficiency reduces the readability for the users beyond the security region, thereby implementing privacy protection.

A text adjusting protection module: when the content displayed by the liquid crystal screen includes text information, a distance d between the user and the liquid crystal screen and an included angle α between the user and the screen are obtained by using the picture taken by the camera and in combination with the human face recognition technology and the image analyzing and processing technology according to S21, and the font size is adjusted according to a graph of the font size versus a luminance contrast threshold in a readability measuring criterion. The font size of the text is reduced while ensuring the user can read the text clearly, so that a user beyond the security region can hardly read the text content clearly.

A color matching scheme adjusting step: colors may get blended under certain conditions of position, size and sight distance with respect to the vision of a person, and such a color blending phenomenon is called as spatial color mixing. The spatial color blending phenomenon is that rich colors are seen at a near distance, and uniform colors are seen at a far distance. A color matching scheme for the display of the screen is changed to control the size of color blocks, similar color blocks have such a distance and spacing that the user located beyond the security region experiences a color blending phenomenon, resulting in impossibility of distinguishing the content and the background, the information displayed by the screen as viewed is subjected to severe blending and loss, thereby enabling the readability within the security region and the privacy protection beyond the security region.

An adjustable parameter self-coordination algorithm module: a coordination algorithm concerning the readability and adjustable parameters is proposed according to the readability measuring criterion and the calculation method formula for each parameter. The luminance contrast of the screen luminance, background color and content color and the parameter values of the color fence width, font size and color matching scheme are automatically calculated according to a real-world environment where the user is located and are self-adjusted to find out an optimal value combination of respective parameters. The reading experience in the security region is maximally ensured, and the readability beyond the security region is maximally reduced, enabling the optimal selection of the algorithm.

The present patent provides the software for fulfilling a screen privacy protection function for a user in a pure software architecture design without the addition of any hardware devices based on the optical heterogeneity of the LCD displayer and in combination with processing and displaying the image and text output by the screen, which simultaneously ensures the screen reading experience for the user per se. This method mainly applies to mobile terminal devices, including mobile phones, tablet and notebook computers, and the like. In this design, based on the basic principle that a picture may be distorted when an included angle between an observer and a screen center is more than a certain angle and a distance between the two exceeds a certain range in light of the birefringence property of the liquid crystal displayer and the photoelectric effect of the liquid crystal screen, the range of the screen privacy security region is defined according to the relative distance between the user and the screen in combination with the technology for adjusting the font size displayed by the screen and the technologies for modifying the color matching scheme and shielding the color, so that the information readability and the reading experience are greatly reduced when other users located beyond the range of the screen privacy security region, with no influence to user reading within the range of the security region basically. The method mainly includes five aspects, mainly comprising: the user motion data is monitored and acquired by a built-in inertia measurement unit and the data of the microphone of the mobile terminal is collected; the environment in which the user is located is determined by analyzing the data from the inertia measurement unit and environment noise data; when the environmental state of the user is determined to be an ambient noisy environment, a smart terminal device automatically turns on the camera of the device at the background, the camera is used to acquire a privacy hazard level of the user reading environment and simultaneously acquire the currently displayed content of the mobile phone and the current operation of the user to obtain the privacy protection level of the currently displayed content for the user, and whether to start the privacy protection mechanism is determined in combination with the two points; according to the distance between the user and the screen analyzed and calculated from the image obtained by the camera, the font size of the content displayed by the screen, the color saturation and luminance, the color matching scheme and the color shielding level are changed, so that the content on the screen cannot be acquired clearly when an included angle between the peeper and the screen exceeds a secure included angle or when the distance between the peeper and the screen exceeds the secure distance, while ensuring the good readability of the content on the screen and the better reading experience for the user; the built-in motion sensor and sound sensor continuously monitor the environment in which the user is located and evaluate the privacy security level, and when the privacy security level of the environment in which the user is located is significantly higher than a determined value, the protection mechanism is turned off and the screen returns to normal display; and with the abovementioned key technology, we can implement the fully intelligently controlled screen protection software in the pure software framework design without the addition of any hardware device and the operation of the user.

The above is to further illustrate the present invention in detail in combination with the particular preferred embodiments, and the particular embodiments of the present invention cannot be deemed to be limited by these illustrations. For those of ordinary skills in the technical field to which the present invention belongs, a number of simple deductions or substitutions can be made also without departing from the concept of the present invention, and shall be deemed as falling within the protection scope of the present invention.

What is claimed is:

1. A screen privacy protection method for a mobile terminal device, wherein the mobile terminal device comprises a processor, the method comprising the following steps:
an environment data acquisition step S1: acquiring, by the processor, the current environmental data of the mobile terminal device to obtain an environmental data processing result;
a privacy leakage determination step S2: comparing, by the processor, the environmental data processing result with different security levels of environmental data features in terms of similarity to determine whether an environment where a user is currently located involves a potential security hazard of privacy leakage, if so, executing a determination step S3 by the processor, or else, executing the environmental data acquisition step S1 by the processor;
the determination step S3: determining, by the processor, whether information on a screen is in an active information sharing state or a passive privacy exposure state, if in the passive privacy exposure state, then executing a screen privacy protection step S4 by the processor, and if in the active information sharing state, then executing the environment data acquisition step S1 rather than executing the screen privacy protection step S4 by the processor; and turning on a camera to detect whether multiple users sharing information are present within a privacy security range of the screen by the processor, if so, then determining a current state of the user to be the active information sharing state by the processor, and if the camera detects that multiple users sharing information are present within a non-privacy security range of the screen, then determining the current state of the user to be the passive privacy exposure state by the processor; and
the screen privacy protection step S4: starting, by the processor, a privacy protection function to bring the screen into a state where a peeper cannot view the information,
wherein in the privacy leakage determination step S2, the camera is started, by the processor, to analyze a number of users currently viewing the screen in combination with a human face recognition technology and to obtain an actual relative position between each user and the screen by using an image fixed-point analysis technology, if the user currently viewing the screen is an owner of the mobile terminal device, the environmental data acquisition step S1 is returned to by the processor, and when the number of users is more than 1, the determination step S3 is executed by the processor,
wherein in the determination step S3,
a privacy security region of the screen is a sector region, a privacy security region S is defined, by the processor, as a user privacy security region by taking the screen as a circle center O, L as a safe distance, an angle α (−30°<α<30°) as an included angle of the privacy security region S in the horizontal direction, and an angle β (−50°<β<50°) as an included angle of the privacy security region S in the vertical direction, and users within the user privacy security region are taken as information sharers by default by the processor; the human face recognition technology and an image processing technology are used to calculate an included angle and a distance between each user and the screen by the processor, if two or more users are present in the user privacy security region, the user is indicated to actively share the user security region and the information on the screen, the current state of the user is the active information sharing state, a privacy protection mechanism is turned off by default for a better viewing experience, and the environmental data acquisition step S1 is returned to by the processor; and
if multiple users are currently viewing the screen and are not in the user privacy security region, the current state of the user is determined to be the passive privacy state by the processor, the screen privacy protection mechanism is started, and the screen privacy protection step S4 is executed by the processor.

2. The screen privacy protection method according to claim 1, wherein the environmental data acquisition step S1 comprises the following steps:
a user selection step S11: setting, by the user, a smart detection mode or a manual start mode as a mode for starting a screen protection mechanism, wherein a collection step S12 is executed in the smart detection mode and the determination step S3 is executed in the manual start mode;
the collection step S12: collecting, by the processor, data from a microphone and a sensor of the mobile terminal device; and
an analysis step S13: analyzing, by the processor, user motion data and environmental sounds to obtain a current environmental security index, wherein
in the privacy leakage determination step S2, when the current environmental security index is higher than a set security value, a security state is determined and the user selection step S11 is returned to by the processor, and if the current environmental security index is lower than the set security value, the determination step S3 is executed by the processor.

3. The screen privacy protection method according to claim 1, wherein in the screen privacy protection step S4, one or a combination of any of the following steps is employed for a screen privacy protection with respect to a liquid crystal screen:
a color and luminance adjustment protection step: adjusting, by the processor, color matching, color luminance and contrast for the display of the liquid crystal screen for privacy protection;
a color shielding protection step: reducing readability by using a fence color structure for a content displayed by the liquid crystal screen to make the liquid crystal screen undergo a color blending effect when viewed from outside of the privacy security range of the screen, by the processor, thereby enabling the privacy protection;
a text adjusting protection step: when the content displayed by the liquid crystal screen includes text information, obtaining a distance between the user and the liquid crystal screen by using a picture taken by the camera in combination with the human face recognition technology and the image processing technology by the processor, and reducing text size by the processor while ensuring the user can read a text clearly so that the user located beyond the security distance can hardly read the text clearly;
a readability function defining step: adjusting parameter values of a screen luminance, a width of a color fence and font size by the processor to ensure a reading experience for the user while preventing the peeper from acquiring the information, thereby enabling the privacy protection.

4. The screen privacy protection method according to claim 3, wherein the color and luminance adjusting protection step comprises:

reducing, by the processor, display luminance of the liquid crystal screen while ensuring the readability for the user;

substituting, by the processor, original colors with similar colors with changing luminance while ensuring the readability for the user, thereby reducing the luminance of the liquid crystal screen viewed by the peeper located beyond the included angle of the user privacy security region, so that the content displayed by the liquid crystal screen is poor in readability and an important content displayed by the liquid crystal screen is difficult to be seen clearly;

substituting, by the processor, an original color combination with a specified color combination without influencing the user during viewing to reduce the readability of the content viewed by the peeper, wherein in the color shielding protection step, important profiles and text contents displayed by the liquid crystal screen are displayed in a structure of the color fence by the processor, a corresponding blended color is used as a ground color of the liquid crystal screen, fence width is increased while ensuring readability for the user, so that only the user located in a middle range of the liquid crystal screen can view all accurate information and peepers on both sides of the liquid crystal screen can only see a background color; and in the text adjusting protection step, if the content currently displayed by the liquid crystal screen includes the text information, the font size, left and right margins, and line spacing are adjusted by the processor so that the peeper at a distance cannot acquire accurate information, a relative distance d between the liquid crystal screen and the user and an included angle θ with the screen are obtained according to an area proportion of the user in the picture taken by the camera and in combination with an image processing technology to define the font size font_size=f(d,θ), which is in direct proportion to the relative distance d and in inverse proportion to the included angle θ with the screen, and the font size is minimized while ensuring readability for the user, thereby reducing readability for the peeper at a place exceeding the included angle and a certain distance.

5. A screen privacy protection system for a mobile terminal device, wherein the mobile terminal device comprises a processor, comprising:

the processor is configured to execute an environment data acquisition module to acquire the current environmental data of the mobile terminal device to obtain an environmental data processing result;

the processor is configured to execute a privacy leakage determination module to compare the environmental data processing result with different security levels of environmental data features in terms of similarity to determine whether an environment where a user is currently located involves a potential security hazard of privacy leakage, if so, the processor is configured to execute a determination module, or else, the processor is configured to execute the environmental data acquisition module;

the processor is configured to execute the determination module to determine whether information on a screen is in an active information sharing state or a passive privacy exposure state, if in the passive privacy exposure state, then the processor is configured to execute a screen privacy protection module, and if in the active information sharing state, then the processor is configured to execute the environment data acquisition module rather than executing the screen privacy protection module; and the processor is configured to turn on a camera to detect whether multiple users sharing information are present within a privacy security range of the screen, if so, then the processor is configured to determine a current state of the user to be the active information sharing state, and if the camera detects that multiple users sharing information are present within a non-privacy security range of the screen, then the processor is configured to determine the current state of the user to be the passive privacy exposure state; and the processor is configured to execute the screen privacy protection module, to start a privacy protection function to bring the screen into a state where a peeper cannot view the information, wherein in the privacy leakage determination module, the camera is started to analyze a number of users currently viewing the screen in combination with a human face recognition technology and to obtain an actual relative position between each user and the screen by using an image fixed-point analysis technology, if the user currently viewing the screen is an owner of the mobile terminal device, the environmental data acquisition module is returned to, and when the number of users is more than 1, the determination module is executed, wherein in the determination module, a privacy security region of the screen is a sector region, a privacy security region S is defined as a user privacy security region by taking the screen as a circle center O, L as a safe distance, an angle α (−30°<α<30°) as an included angle of the privacy security region S in the horizontal direction, and an angle β (−50°<β<50°) as an included angle of the privacy security region S in the vertical direction, and users within the user privacy security region are taken as information sharers by default; the human face recognition technology and an image processing technology are used to calculate an included angle and a distance between each user and the screen, if two or more users are present in the user privacy security region, the user is indicated to actively share the user privacy security region and the information on the screen, the current state of the user is the active information sharing state, a privacy protection mechanism is turned off by default for a better viewing experience, and the environmental data acquisition module is returned to; and if multiple users are currently viewing the screen and are not in the user privacy security region, the current information state of the user is determined to be the passive privacy state, the screen privacy protection mechanism is started, and the screen privacy protection module is executed.

6. The screen privacy protection system according to claim 5, wherein the environmental data acquisition module comprises:

a user selection module, executed by the processor, by which the user sets a smart detection mode or a manual start mode as a mode for starting a screen protection mechanism, wherein a collection module is executed in the smart detection mode and the determination module is executed in the manual start mode;

the collection module, executed by the processor to collect data from a microphone and a sensor of the mobile terminal device; and an analysis module, executed by the processor to analyze user motion data and environmental sounds to obtain a current environmental security index, wherein in the privacy leakage determination module, when the current environmental security index is higher than a set security value, a security state is determined and the user selection module is returned to, and if the current environmental security index is lower than the set security value, the determination module is executed.

7. The screen privacy protection system according to claim 5, wherein in the screen privacy protection module, one or a combination of any of the following modules is employed for a screen privacy protection with respect to a liquid crystal screen:

a color and luminance adjustment protection module, executed by the processor to adjust color matching, color luminance and contrast for the display of the liquid crystal screen for privacy protection;

a color shielding protection module, executed by the processor to reduce readability by using a fence color structure for a content displayed by the liquid crystal screen to make the liquid crystal screen undergo a color blending effect when viewed from outside of the privacy security range of the screen, thereby enabling the privacy protection;

a text adjusting protection module, executed by the processor to, when the content displayed by the liquid crystal screen includes text information, obtaining a distance between the user and the liquid crystal screen by using a picture taken by the camera in combination with the human face recognition technology and the image processing technology, and reducing text size while ensuring the user can read a text clearly so that the user located beyond the security distance can hardly read the text clearly;

a readability function defining module, executed by the processor to adjust parameter values of a screen luminance, a width of a color fence, and font size to ensure a reading experience for the user while preventing the peeper from acquiring the information, thereby enabling the privacy protection.

8. The screen privacy protection system according to claim 7, wherein the color and luminance adjusting protection module comprises:

reducing display luminance of the liquid crystal screen while ensuring the readability for the user;

substituting original colors with similar colors with changing luminance while ensuring the readability for the user, thereby reducing the luminance of the liquid crystal screen viewed by the peeper located beyond the included angle of the user security region, so that the content displayed by the liquid crystal screen is poor in readability and an important content displayed by the liquid crystal screen is difficult to be seen clearly;

substituting an original color combination with a specified color combination without influencing the user during viewing to reduce the readability of the content viewed by the peeper, wherein in the color shielding protection module, important profiles and text contents displayed by the liquid crystal screen are displayed in a structure of the color fence, a corresponding blended color is used as a ground color of the liquid crystal screen, the fence width is increased while ensuring readability for the user, so that only the user located in a middle range of the liquid crystal screen can view all accurate information and peepers on both sides of the liquid crystal screen can only see a background color; and in the text adjusting protection module, if the content currently displayed by the liquid crystal screen includes the text information, the font size, left and right margins, and line spacing are adjusted so that the peeper at a distance cannot acquire accurate information, a relative distance d between the liquid crystal screen and the user and an included angle $\theta$ with the screen are obtained according to an area proportion of the user in the picture taken by the camera and in combination with an image processing technology to define the font size font_size=$f(d,\theta)$, which is in direct proportion to the relative distance d and in inverse proportion to the included angle $\theta$ with the screen, and the font size is minimized while ensuring readability for the user, thereby reducing readability for the peeper at a place exceeding the included angle and a certain distance.

9. A screen privacy protection system according to claim 7, wherein the color and luminance adjusting protection module comprises a luminance adjusting protection module executed by the processor and a luminance contrast adjusting module executed by the processor, in the luminance adjusting protection module, an image processing and analyzing technology is performed according to a picture taken by the camera to obtain the distance and the included angle between the user and the screen, perceived luminance received by the user at a definite distance and at a definite included angle is calculated with a luminance calculation formula, backlight luminous intensity displayed by the liquid crystal screen is reduced to decrease the luminance of an area source of the screen and decrease the perceived luminance received by the user, thereby achieving the purpose of protecting the readability within the user privacy security region but influencing the readability for the user ;

in the luminance contrast adjusting module, due to an influence of a luminance contrast of the screen luminance to the readability, a color combination of a background color and a content color is modified according to a color perceived luminance calculation formula $Y=((R*299)+(G*587)+(B*114))/$, and a background and the content displayed by the liquid crystal screen are respectively endowed with opposite colors with strong contrast or a color pair with low contrast, thereby achieving the purpose of influencing the readability for the user by changing the contrast;

in the text adjusting protection module, when the content displayed by the liquid crystal screen includes text information, a distance d between the user and the liquid crystal screen and an included angle a between the user and the screen are obtained by using the picture taken by the camera and in combination with the human face recognition technology and the image analyzing and processing technology, the font size is adjusted according to a graph of the font size versus a luminance contrast threshold in a readability measuring criterion, and the font size is reduced while ensuring the user can read the text clearly, so that the user -located beyond the user privacy security region can hardly read the content of the text clearly;

the screen privacy protection module also comprises a color matching scheme adjusting module and an adjustable parameter self-coordination algorithm module, in the color matching scheme adjusting module, a color matching scheme for the display of the liquid crystal screen is changed, a size of color blocks, and a distance and a space of similar color blocks are controlled that the user located beyond the user privacy security region experiences a color blending phenomenon while watching the liquid crystal screen, resulting in impossibility of distinguishing the background and the content displayed by the liquid crystal screen, the information displayed by the screen as viewed is subjected to severe blending and loss, thereby enabling the readability within the user privacy security region and the privacy protection beyond the user privacy security region; and in the adjustable parameter self-coordination algorithm module, the luminance contrast of the screen luminance, the background color and the content color and the parameter values of the width of the color fence, the font size and the color matching scheme are automatically calculated according to a real-world environment where the user is located and are self-adjusted to find out an optimal value combination of respective parameters.

\* \* \* \* \*